United States Patent
Gottzein et al.

(10) Patent No.: US 11,029,410 B2
(45) Date of Patent: Jun. 8, 2021

(54) BATCH PROCESSING FOR GNSS SIGNAL PROCESSING IN A USER SATELLITE

(71) Applicant: Airbus Defence and Space GmbH, Taufkirchen (DE)

(72) Inventors: Eveline Gottzein, Hoehenkirchen (DE); Hannes Filippi, Munich (DE); Andres Barrios-Montalvo, Munich (DE); Peter A. Krauss, Rosenheim (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 191 days.

(21) Appl. No.: 15/716,948

(22) Filed: Sep. 27, 2017

(65) Prior Publication Data

US 2018/0088244 A1 Mar. 29, 2018

(30) Foreign Application Priority Data

Sep. 28, 2016 (DE) ...................... 10 2016 218 655.8

(51) Int. Cl.
| | |
|---|---|
| *G01S 19/14* | (2010.01) |
| *G01S 19/37* | (2010.01) |
| *G01S 19/42* | (2010.01) |
| *G01S 19/52* | (2010.01) |
| *B64G 3/00* | (2006.01) |

(52) U.S. Cl.
CPC ............... *G01S 19/14* (2013.01); *B64G 3/00* (2013.01); *G01S 19/37* (2013.01); *G01S 19/42* (2013.01); *G01S 19/52* (2013.01)

(58) Field of Classification Search
CPC .......... G01S 19/14; G01S 19/37; G01S 19/42; G01S 19/52; B64G 3/00
See application file for complete search history.

(56) References Cited

U.S. PATENT DOCUMENTS 5,452,211 A * 9/1995 Kyrtsos ................. G01C 21/26
342/357.24
5,935,196 A * 8/1999 Brodie .................... G01S 19/14
244/158.4

(Continued)

OTHER PUBLICATIONS

Li, Taohu et al., "Initial Orbit Determination Algorithm for HEO Satellites Using a Single Navigation Satellite", Journal of Beijing University of Aeronautics and Astronautics, vol. 38, No. 6, Jun. 2012 (Year: 2012).*

(Continued)

*Primary Examiner* — Cassi J Galt
(74) *Attorney, Agent, or Firm* — Jenkins, Wilson, Taylor & Hunt, P.A.

(57) ABSTRACT

The disclosure herein relates to a receiver for use in a user satellite, located among other things partly or wholly on orbits remote from Earth, for example. The receiver comprises a receiving unit and a processing unit. The receiving unit is configured to receive signals transmitted by navigation satellites of one or more global navigation satellite systems (GNSS). The processing unit is configured to determine measurements based on the data contained in the signals received. The processing unit is further configured to carry out a calculation of position, velocity and time (PVT) based on batch processing of the measurements. The disclosure herein further relates to a method and a user satellite.

7 Claims, 4 Drawing Sheets

(56) References Cited

U.S. PATENT DOCUMENTS

| | | | | |
|---|---|---|---|---|
| 5,969,670 A * | 10/1999 | Kalafus | ................... | G01S 19/20 |
| | | | | 244/183 |
| 6,424,913 B1 | 7/2002 | Fichter et al. | | |
| 6,608,589 B1 * | 8/2003 | Devereux | ............... | G01C 21/00 |
| | | | | 342/357.29 |
| 6,683,565 B2 * | 1/2004 | Fichter | ................... | G01S 19/05 |
| | | | | 342/356 |
| 6,882,908 B2 * | 4/2005 | Laurichesse | ............ | G01S 19/40 |
| | | | | 342/357.23 |
| 7,050,002 B1 | 5/2006 | Wright et al. | | |
| 8,228,229 B2 * | 7/2012 | Wilhelm | ................. | G01S 19/14 |
| | | | | 342/357.64 |
| 8,259,012 B2 * | 9/2012 | Li | .......................... | G01S 19/14 |
| | | | | 342/357.77 |
| 9,453,903 B2 * | 9/2016 | Robinson | ................ | G01S 19/11 |
| 10,126,429 B2 * | 11/2018 | Farrokhi | ............... | G01S 19/246 |
| 2004/0257277 A1 * | 12/2004 | Abraham | .............. | G01S 5/0036 |
| | | | | 342/357.59 |
| 2010/0073223 A1 | 3/2010 | Wilhelm et al. | | |
| 2010/0090889 A1 * | 4/2010 | Hwang | ................... | G01S 19/09 |
| | | | | 342/357.68 |
| 2010/0117897 A1 * | 5/2010 | Riley | ...................... | G01S 19/25 |
| | | | | 342/357.65 |

OTHER PUBLICATIONS

Montenbruck et al., "Reduced dynamic orbit determination using GPS code and carrier measurements," Aerospace Science and Technology, Elsevier Masson, FR, vol. 9, No. 3, pp. 261-271 (Apr. 1, 2015).

Hechenblaikner et al., "GNSS-based precise orbit determination for a highly ecentric orbit in the STE-QUEST mission," GNSS 2013—Proceedings of the 26th International Technical Meeting of the Institute of Navigation (ION) Satellite Division, ION GNSS+ 2013, Nashville, Tennessee, pp. 3347-3356 (Sep. 16-20, 2013).

Extended European Search Report for European Application No. 17189587.3 dated Feb. 19, 2018.

European Office Action for Application No. 17189587.3 dated Mar. 16, 2020.

* cited by examiner

BATCH PROCESSING FOR GNSS SIGNAL PROCESSING IN A USER SATELLITE

CROSS-REFERENCE TO RELATED APPLICATION

This application claims priority to German Patent Application DE 10 2016 218 655.8 filed Sep. 28, 2016, the entire disclosure of which is incorporated by reference herein.

TECHNICAL FIELD

The disclosure herein relates to a receiver for use in a user satellite, a method and a user satellite.

BACKGROUND

In a receiver for receiving signals of one or more global navigation satellite systems, GNSS, on a user satellite, a cold start requires a calculation of an initial position, velocity and time, PVT, from a Kalman filter of the receiver. This initial PVT can be uploaded from a ground station, if contact exists between the ground station and the receiver. Alternatively the PVT can be calculated in the receiver by a kinematic point solution, which necessitates a simultaneous availability of measurements of at least four navigation satellites. Above a low Earth orbit, which is located between 200 km and 2000 km, the alternative solution can be a problem. This is the case in particular if the user satellite associated with the receiver is located/moving on ascent routes to its target position or on elliptical orbits. In this case too short a reception timewise sometimes exists between the receiver and the navigation satellites. Furthermore, too great a pause (too great a time interval) exists between successive connections. In addition, the aforementioned Kalman filter is generally sensitive to a sparse availability of measurements.

The disclosure herein is consequently based on the problem of carrying out an autonomous initialization in the event of sparse measurements.

SUMMARY

According to a first aspect, a receiver is provided for use in a user satellite, among other things located, for example, partly or wholly on paths remote from the Earth. The receiver comprises a receiving unit and a processing unit. The receiving unit comprises one or more antennas and is configured to receive signals transmitted by navigation satellites of one or more, for example interoperable, global navigation satellite systems. The processing unit is configured to determine measurements based on the data contained in the signals received. The processing unit is configured further to carry out a calculation of position, velocity and time, PVT, based on batch processing of the measurements.

This has the advantage that the simultaneous availability of measurements of at least four navigation satellites is no longer required.

The expression "for use in a user satellite" can also be understood in such a way that the receiver itself or parts of the receiver can be located or arranged and mounted on the user satellite, in the user satellite and/or on/at the user satellite. The expression "batch processing" is a literal translation from the English.

The processing unit can be configured in the form of an on-board computer or as part of an ASIC. The predetermined time period can be determined by an availability of at least four measurements. The predetermined time period can further be defined by a maximum time. Furthermore, the predetermined time period can be defined by a maximum buffer time. The predetermined time period can further be defined by a threshold value on memory in the processing unit and/or in a memory unit. The predetermined time period can further be determined by a minimum requirement for measurements needed, which are required to calculate the PVT with a required accuracy.

The receiver can further include a memory unit. The memory unit can be configured to store the data contained in the signals received or the measurements based on the data in batches during the predetermined time period and/or with a predefined time buffer. The processing unit can further be provided and/or configured to access or retrieve the measurements and/or data stored in batches after the predetermined time period or after the predefined time buffer. The processing unit can further be configured to process the data and/or measurements stored in batches. The processing can include the calculation of the PVT.

The processing unit can further be provided to carry out the calculation of the PVT after and/or on completion of the predetermined time period. That can also comprise a combination of calculation during the predetermined time period and calculation after the predetermined time period.

This has the advantage of shortening the time up to the availability of the PVT.

The receiving unit can further be configured to receive the signals transmitted by the navigation satellites sequentially and/or simultaneously. The processing unit can further be configured to determine the measurements from the data contained in the signals received sequentially and/or simultaneously. The processing unit can further be configured to carry out an initial and/or continuous calculation of the PVT based on batch processing of the measurements.

The receiving unit can further be configured to receive the signals transmitted by the navigation satellites over a predetermined time period. The processing unit can further be configured to batch the measurements over the predetermined time period and carry out the calculation of the PVT, for example including the initial PVT, based on batch processing of the batched measurements.

"Batching" or "batched" can be understood here as "collection" or "collected".

The processing unit can further be connected to the receiving unit. The processing unit can further be configured to batch the measurements so as to carry out the calculation of the PVT after the predetermined time period.

"After the predetermined time period" can be understood here as "upon completion of the predetermined time period", but also as "time after the predetermined time period", so that a buffer time can be present between stored/buffered batch and the calculation of the PVT.

The receiving unit and/or the processing unit can also be provided to store the signals transmitted by the navigation satellites or the data and/or the measurements based on the data for the predetermined time period. For the storage of the measurements and/or data, the processing unit can be configured to process the signals transmitted by the navigation satellites into the corresponding measurements and/or data and/or the appropriate data format.

The processing unit can further be configured to store the measurements and/or data in batches in order to process them after the predetermined time period.

The signals transmitted by the navigation satellites can be understood here also as navigation signals, which comprise typical encrypted or unencrypted GNSS navigation messages. These GNSS navigation messages can be contained in the measurements and/or data which are contained in the received signals.

The receiving unit can further be configured to receive signals transmitted by the navigation satellites above a low Earth orbit. The low Earth orbit can lie between 200 and 2000 km.

This has the advantage of shortening the time up to availability of the PVT above the low Earth orbit.

The navigation satellites can be available (only) to some extent during the predetermined time period or cannot be available to some extent during the predetermined time period.

The PVT calculated from the batch processing can be used for verification in comparison with a standard calculation for the PVT from a Kalman filter. This thus represents a redundant solution.

A condition for an adequate measurement or measuring accuracy can be a minimum duration for the predetermined time period. The signals transmitted by the navigation satellites can be present over the complete predetermined time period or can also be present only to some extent over the predetermined time period.

"Be present" can be understood here as a signal that can be received from the respective navigation satellite with data contained therein for the PVT calculation determined from the data.

The batch processing can comprise a batching or collection of the measurements. The measurements can contain at least four pseudorange measurements and at least four range rate measurements. Furthermore, the measurements can contain carrier phase measurements. The processing unit can further be configured to determine the at least four pseudorange measurements at least at two different times. The processing unit can further be configured to determine the at least four range rate measurements at least at two different times. The processing unit can further be configured to determine the at least four pseudorange measurements at the same times as the at least four range rate measurements.

The processing unit can be configured to batch a portion of the measurements, for example two pseudorange measurements and two range rate measurements, at a first time and to batch a remaining portion of the measurements, for example two pseudorange measurements and two range rate measurements, at least at one further time. The first time and the at least one further time can be located in the predetermined time period. The first time and the at least one further time can determine the start and the end of the time period. The portion of the measurements can be associated with one navigation satellite and/or different navigation satellites. The measurements can contain the portion and the remaining portion of the measurements, or correspond to the portion and the remaining portion of the measurements.

For example, the portion of the measurements (at the first time) can comprise two pseudorange measurements, wherein the remaining portion of the measurements can comprise, on the one hand, two pseudorange measurements and two range rate measurements (at a second time), and on the other hand two range rate measurements (at a third time). In this case the first and third time can determine the start and the end of the predetermined time period. Fewer or more than three times are conceivable, wherein the first and last time can lie within the predetermined time period or can determine this.

The processing unit can further be configured to use a Kalman filter to calculate a PVT. In this case, the PVT calculated with the aid of the Kalman filter can differ from the PVT calculated with the aid of batch processing. The results of the calculated PVT can be compared with results of the PVT calculated via the Kalman filter to verify the correctness of the results of the PVT calculated with the Kalman filter.

Furthermore, the predetermined time period can be a function of an availability of the navigation satellites. The predetermined time period can also be a function of a set of the batched or collected measurements.

The previous paragraphs and the features described herein also have the advantage of increasing the accuracy of a position determination. This can in turn result in fuel being able to be conserved in the user satellite, collisions being able to be avoided, for example in the so-called GEO Belt crossing. GEO boxes can also be reduced in size and the co-positioning in a GEO box can also be extended to even more user satellites, permitting an increase in the density of geostationary user satellites.

According to a second aspect, a user satellite with a receiver according to the first aspect is provided. The user satellite comprises an electric and/or chemical drive.

When using electric propulsion units, the time for an ascent into the geostationary orbit (GEO) can increase from a few days (for chemical propulsion units) to several months. This can make autonomous position determination economical instead of the use of ground stations. The proposed autonomous initialization and PVT determination are a substantial element to this end.

Furthermore, a redundant availability of another independent position determination can facilitate long-term autonomy of 15-20 years.

According to a third aspect, a method is provided for use in a user satellite, among other things located partly or wholly on orbits remote from Earth, for example. The method comprises receiving, by a receiving unit, of signals transmitted by navigation satellites of one or more, for example interoperable, global navigation satellite systems, GNSS. The method further comprises determination, by a processing unit, of measurements based on data contained in the signals received. The method further comprises carrying out, by a processing unit, of a calculation of position, velocity and time, PVT, based on batch processing of the measurements.

According to a fourth aspect, a computer program for executing the method according to the fourth aspect is provided.

According to a fifth aspect, a computer program product is provided. The computer program product includes a machine-readable program carrier, on which a computer program according to the fifth aspect is stored in the form of electronically and/or optically readable control signals.

It is clear to a person skilled in the art that the declarations stated herein can be/become implemented using hardware circuits, software or a combination of these. The software can be connected to programmed microprocessors or a general computer, an ASIC (Application Specific integrated Circuit) and/or DSPs (Digital Signal Processors). For example, the receiving unit, memory unit and the processing unit can be realized partly as a computer or a processor (for example a microprocessor, microcontroller or DSP). It is also clear to a person skilled in the art that even if the details described herein are described in relation to a method, these details can also be realized in a suitable device unit, a computer processor or a memory connected to a processor, wherein the memory is provided with one or more programs that implement the method when they are executed by the processor.

Even if some of the aspects described above were described in relation to the receiver, these aspects can also apply to the method. In precisely the same way, the aspects described above in relation to the method can apply correspondingly to the receiver.

Further aims, features, advantages and application possibilities result from the following description of exemplary embodiments, which are to be understood as not restrictive, with reference to the associated drawings. Here all features described and/or illustrated show by themselves or in any combination the object disclosed here, even independently of their grouping in the claims or their back-references. The dimensions and proportions of the components shown in the figures are not necessarily to scale in this case; they can deviate from what is shown here in the case of embodiments to be implemented.

DETAILED DESCRIPTION

The method variants described here and their functional and operational aspects serve purely for a better understanding of their structure, mode of operation and properties; they do not restrict the disclosure to the exemplary embodiments, for instance. The figures are partially schematic, wherein substantial properties and effects are shown significantly enlarged to some extent to clarify the functions, active principles, technical configurations and features. Every mode of functioning, every principle, every technical configuration and every feature which is/are disclosed in the figures or in the text can be combined freely and in any way with all claims, every feature in the text and in the other figures, other modes of functioning, principles, technical configurations and features that are contained in or result from this disclosure so that all conceivable combinations are to be associated with the devices described. Combinations between all individual implementations in the text, meaning in each section of the description, in the claims and also combinations between different variants in the text, in the claims and in the figures are also comprised here and can be made the subject of further claims. Even the claims do not limit the disclosure and thus the combination options of all features demonstrated with one another. All disclosed features are explicitly also disclosed here individually and in combination with all other features.

The receiver, the method and the satellite are described below with reference to exemplary embodiments.

Specific details are presented below, without being restricted to these, to give a complete understanding of the present disclosure. However, it is clear to a person skilled in the art that the present disclosure can be used in other exemplary embodiments, which may deviate from the details set out below.

Figure 1:
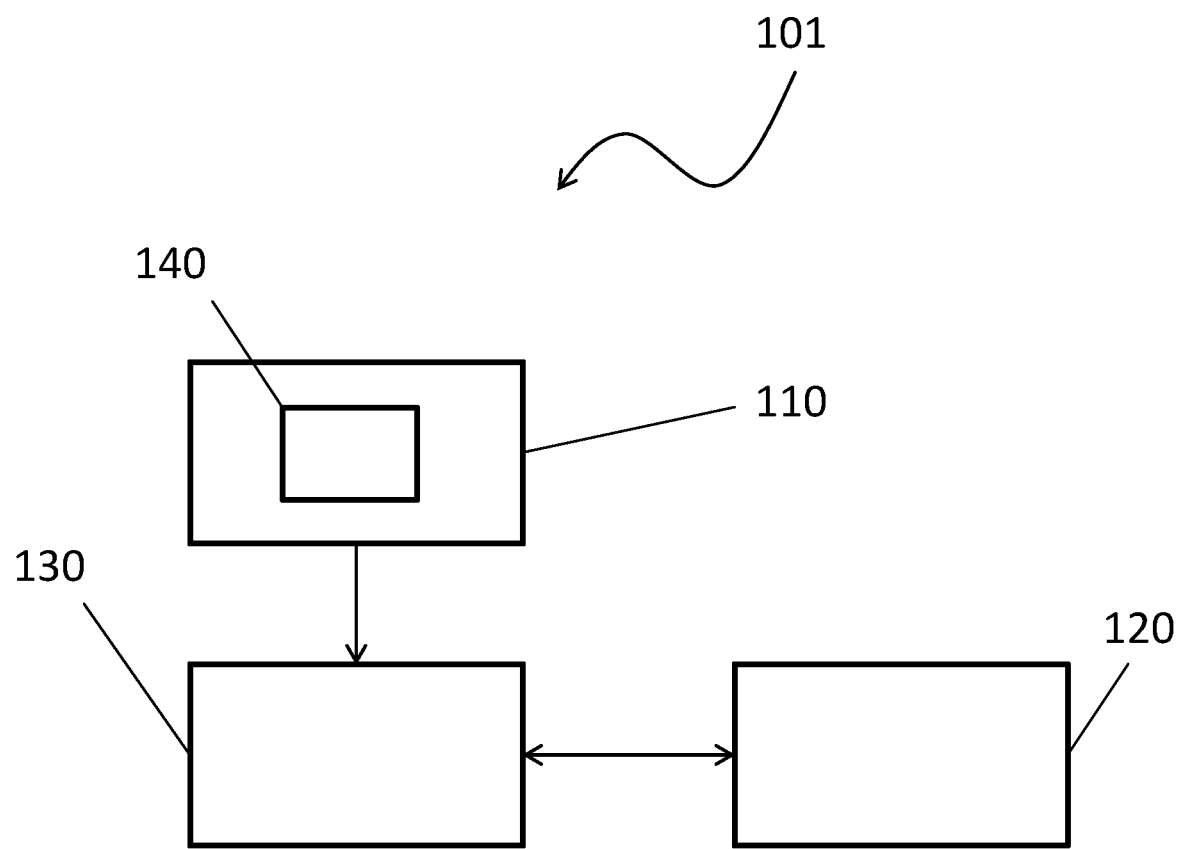
FIG. 1 shows schematically and in a simplified manner an exemplary embodiment of a receiver.

FIG. 1 shows an exemplary embodiment of a receiver 101 schematically and in a simplified manner. The receiver 101 is provided for use in a user satellite. The receiver 101 comprises a receiving unit 110 and a processing unit 130. The receiver can further comprise a memory unit 120. The receiving unit 110 is configured to receive, via one or more antennas 140, signals transmitted by navigation satellites of one or more, for example interoperable, global navigation satellite systems. The processing unit 130 is configured to determine measurements based on the data contained in the signals received. The processing unit 130 is further configured to carry out a calculation of position, velocity and time, PVT, based on batch processing of the measurements. The calculation of the PVT can represent an initial and/or a continuous calculation, i.e. permanent calculation, of the PVT. The memory unit 120 can be configured to store the measurements and/or data in batches during the predetermined time period and/or with a predefined time buffer. The processing unit 130 can further be provided and/or formed to access the measurements and/or data stored in batches and to retrieve these following the predetermined time period or following the predefined time buffer. The processing unit can further be configured to process the measurements and/or data stored in batches. The processing can include the calculation of the PVT. The processing unit 130 can also be formed in the form of an on-board computer. The predetermined time period can be defined by an availability of at least four measurements. The predetermined time period can further be defined by a maximum time. The predetermined time period can further be defined by a maximum buffer time. The predetermined time period can further be defined by a threshold value on memory space in the processing unit 130 and/or in the memory unit 120. The predetermined time period can further be determined by a minimal requirement of required measurements that are necessary for calculating the PVT. The processing unit 130 can further be provided to carry out the calculation of the PVT following and/or on completion of the predetermined time period. This can also comprise a combination of calculation during the predetermined time period and calculation after the predetermined time period. The receiving unit 110 can also be formed to receive the signals transmitted by the navigation satellites over a predetermined time period. The processing unit 130 can also be configured to batch the measurements over the predetermined time period and carry out the calculation based on batch processing of the batched measurements. The processing unit 130 can further be connected to the receiving unit 110 and the memory unit 120. The processing unit 130 can further be configured to batch the measurements, in order to carry out the calculation of the PVT with a required accuracy after the predetermined time period. The processing unit 130 can further be configured to use a Kalman filter to calculate a PVT. In this case, the PVT calculated with the aid of the Kalman filter may differ from the PVT calculated with the aid of the batch processing. The results of the calculated PVT can be compared with results of the PVT calculated by the Kalman filter, in order to verify the correctness of the results of the PVT calculated with the Kalman filter.

Furthermore, the predetermined time period can be a function of an availability of the navigation satellites. The predetermined time period can also be a function of a set of the batched or collected measurements and/or data.

Figure 2:
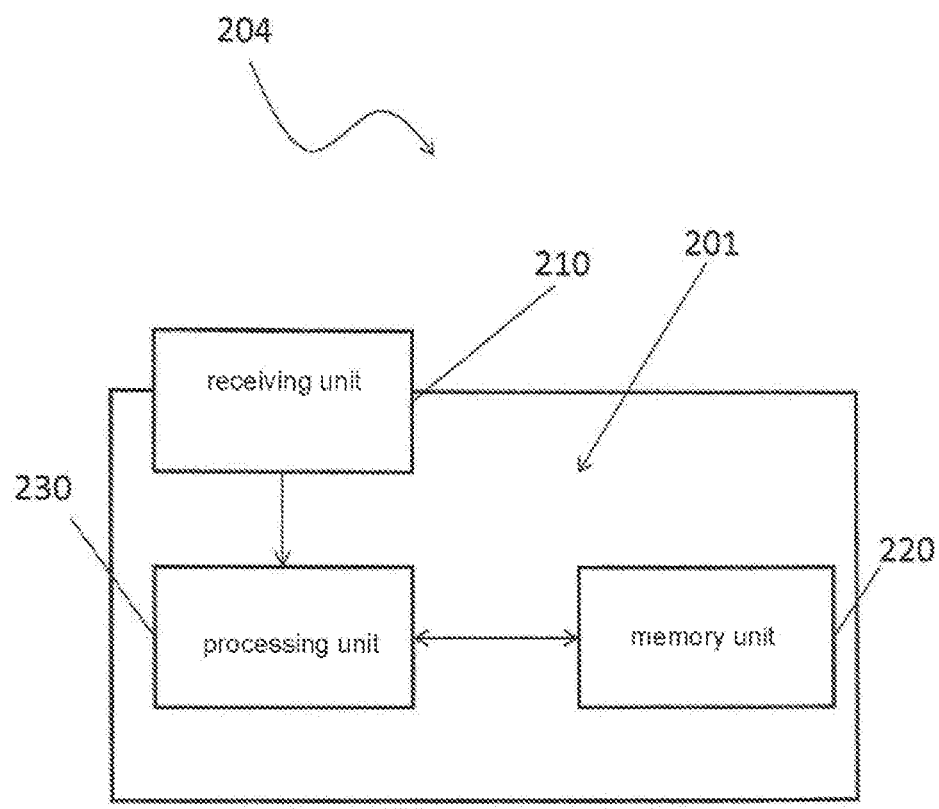
FIG. 2 shows schematically and in a simplified manner an exemplary embodiment of a user satellite with a receiver.

FIG. 2 shows schematically and in a simplified manner an exemplary embodiment of a user satellite 204 with a receiver 201. The user satellite 204 is provided with a receiver according to FIG. 1. The receiver 201 can be arranged partly outside the user satellite. This means that parts of the receiver 201, such as the processing unit 230 and the memory unit 220, for example, can be arranged in the user satellite, while the receiving unit 210 can be arranged outside or partly outside and partly inside. The receiving unit 210 can also be configured to receive the signals transmitted by the navigation satellites. The receiving unit 210 and/or the processing unit 230 can also be provided to store the signals transmitted by the navigation satellites or the measurements and/or data for the predetermined time period. For storage of the measurements and/or data contained, the processing unit 230 can be configured to process the signals transmitted by the navigation satellites into the corresponding measurements and/or data and/or the appropriate data format (also file format). It is conceivable here that the receiving unit has demodulation and decoding units, for example, to have decoded signals present in the baseband, which it can then convert by a suitable processor in connection with a storable medium (can be contained in the processing unit 230) into the data suitable for the calculation of the PVT and store this.

The processing unit 230 can further be configured to store the measurements and/or data in batches, in order to process them after the predetermined time period. The signals transmitted by the navigation satellites can be understood here also as navigation signals, which comprise typical encrypted or unencrypted GNSS navigation messages. These GNSS navigation messages can be contained in the measurements and/or data contained in the signals received. The receiving unit 210 can further be configured to receive signals transmitted by the navigation satellites above a low Earth orbit. The low Earth orbit can lie between 200 and 2000 km. The receiving can take place above the low Earth orbit on the ascent of the satellite 204.

The satellite 204 further comprises an electric and/or chemical drive. The satellite 204 can further be an applications satellite, which can be used, for example, as a communications satellite in geostationary orbit.

Figure 3:
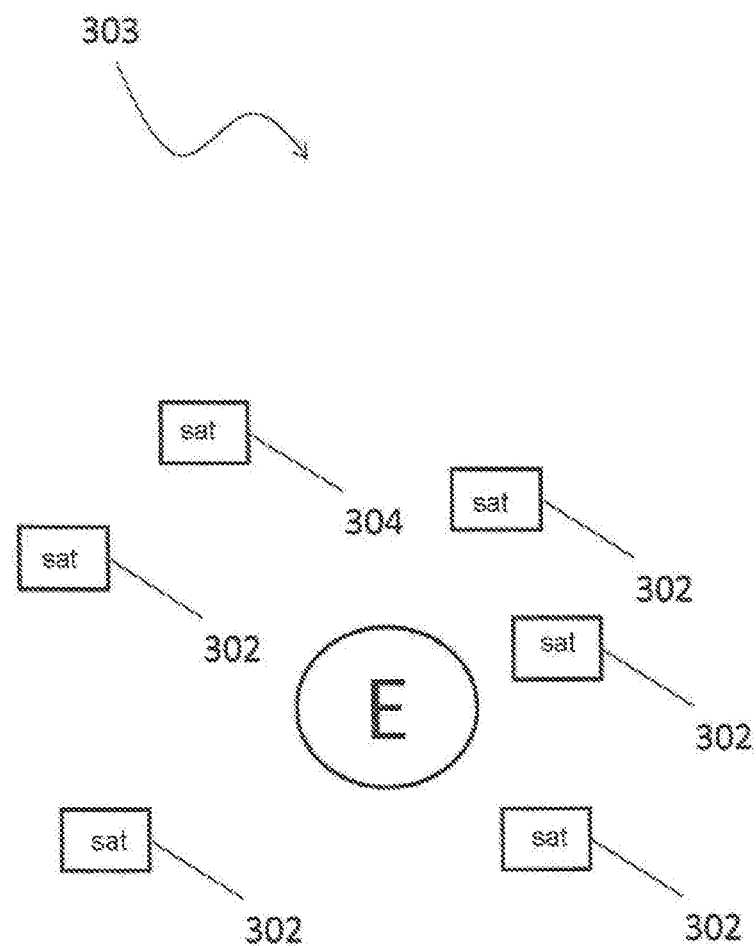
FIG. 3 shows schematically and in a simplified manner an exemplary embodiment of a global satellite navigation system with navigation satellites comprising a receiver.

FIG. 3 shows schematically and in a simplified manner a global satellite navigation system GNSS, 303 with navigation satellites 302 and a user satellite 304 comprising a receiver corresponding to FIGS. 1 and 2, wherein the navigation satellites 302 and the user satellite 304 orbit an Earth E shown in a schematic and simplified manner. The GNSS 303 comprises several navigation satellites 302. It is conceivable that the measurements from the navigation satellites 302 of the GNSS 303 can only be available to some extent during the predetermined time period. The calculation of the PVT for the user satellite can be carried out as long as at least four measurements are available sequentially in the measuring period. However, the navigation satellites 302 do not have to be available over the entire predetermined time period. The calculated PVT from the batch processing can be used for verification in comparison with a standard calculation for the PVT from a Kalman filter and is thus a redundant solution. It is also conceivable that the navigation satellites 302 of the GNSS 303 cannot be available to some extent during the predetermined time period. The calculation of the PVT can be carried out even with a sparse presence of measurements of the navigation satellites 302. The at least four collected/batched measurements can be present in the signals transmitted by the navigation satellites 302 of the GNSS 303. The calculation of the PVT can be carried out based on these measurements. A condition for an adequate measurement or measuring accuracy can be a minimum duration for the predetermined time period. The signals transmitted by the navigation satellites 302 of the GNSS 303 can be present over the complete predetermined time period or can also only be available to some extent over the predetermined time period. The time period can be understood in such a way that it specifies the time or the time interval in which the receiving unit of the receiver is at least partly capable of receiving at least four measuring signals from navigation satellites 302, meaning that a connection can be set up between them at least during a partial amount of the time period.

Figure 4:
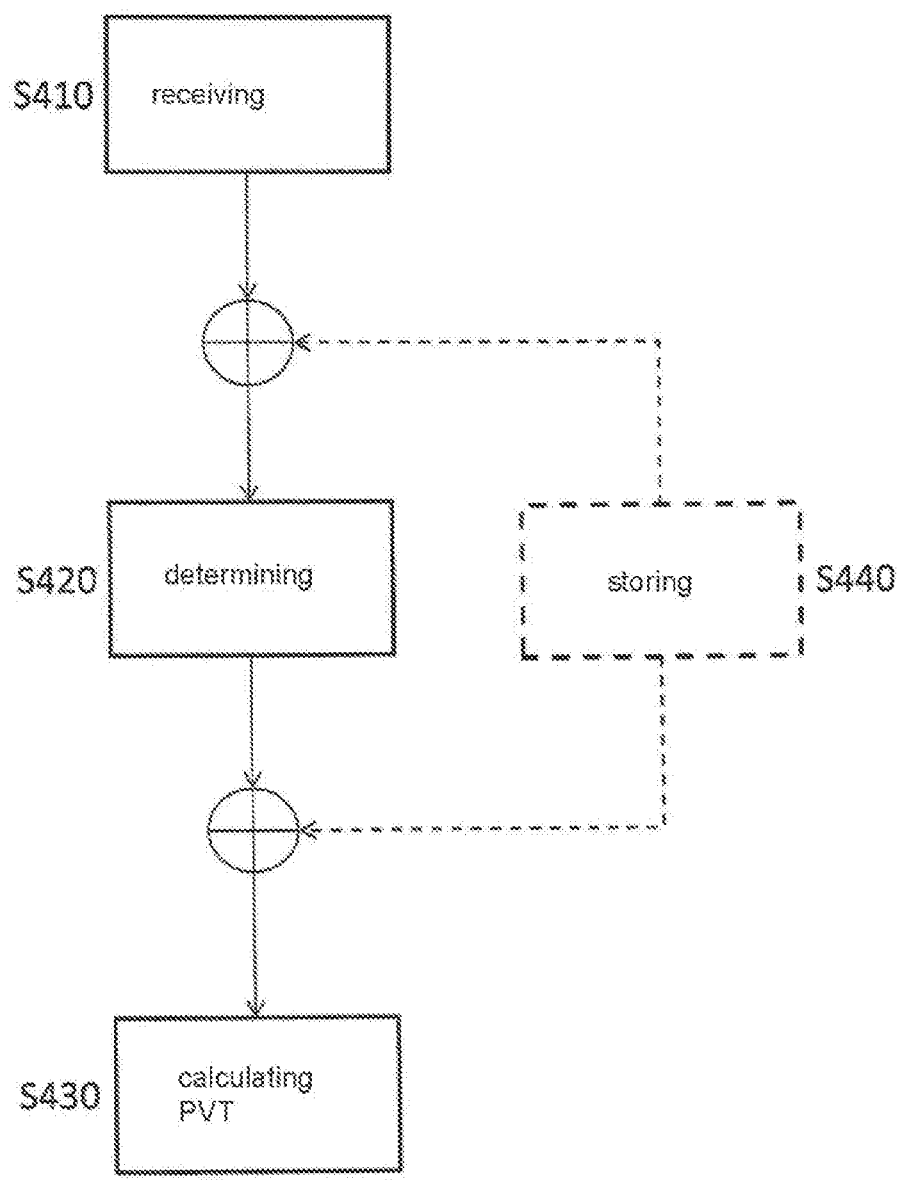
FIG. 4 shows schematically and in a simplified manner an exemplary embodiment of a method for use in a user satellite.

FIG. 4 shows an exemplary embodiment of a method schematically and in a simplified manner. The method according to FIG. 4 is provided for use in a user satellite. The method comprises receiving S410 by a receiving unit according to FIGS. 2 and 3, of signals transmitted by navigation satellites of one or more, for example interoperable, global navigation satellite systems, GNSS. The method further comprises the determination S420, by a processing unit, of measurements based on data contained in the signals received. The method further comprises the carrying out S430, by the processing unit according to FIGS. 2 and 3, of a calculation of position, velocity and time, PVT, based on batch processing of the measurements. The method can further comprise intermediate storage S440, by a memory unit according to FIG. 1, of the signals transmitted by navigation satellites. The processing unit can further be configured to retrieve (indicated as a dashed line) the measurements and/or data from the memory unit if a predetermined time period, in which the receiving unit has received the signals of the navigation satellites, was exceeded. Following retrieval, the processing unit can carry out the calculation of the PVT S430.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

The disclosure herein is naturally not restricted in any way to the embodiments described previously. On the contrary, many options for modifications to this will be evident to an average expert without departing from the basic idea of the disclosure herein as defined in the enclosed claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A receiver for use in a user satellite, the receiver comprising:
 a receiving unit, which comprises one or more processors and one or more antennas and is configured to receive signals transmitted by navigation satellites of one or more global navigation satellite systems (GNSS); and
 a processing unit, which comprises one or more processors and is configured to determine measurements based on data contained in the signals received and to carry out a calculation of position, velocity and time (PVT) based on batch processing of the measurements;
 wherein the receiving unit is further configured to receive the signals transmitted by the navigation satellites non-simultaneously;
 wherein the processing unit is further configured to determine the measurements from the data contained in the signals received non-simultaneously, and to carry out an initial or continuous calculation of the PVT based on batch processing of the measurements;
 wherein the receiving unit is further configured to receive the signals transmitted by the navigation satellites over a predetermined time period;
 wherein the predetermined time period is determined by a minimum requirement for measurements needed, which are required to calculate the PVT with a required accuracy;
 wherein the processing unit is further configured to batch the measurements over the predetermined time period and to carry out the calculation of the PVT based on batch processing of the batched measurements;
 wherein the processing unit is configured further to use a Kalman filter for calculating a PVT; and
 wherein results of the PVT calculated based on batch processing are compared with results of the PVT calculated via the Kalman filter to verify correctness of results of the PVT calculated with the Kalman filter.

2. The receiver according to claim 1, wherein the processing unit is further connected to the receiving unit and is configured to batch the measurements, in order to carry out the calculation of the PVT after the predetermined time period.

3. The receiver according to claim 1, wherein the processing unit is further configured to store the measurements in batches in order to process them after the predetermined time period.

4. The receiver according to claim 1, wherein the predetermined time period is a function of an availability of the navigation satellites.

5. A user satellite comprising:
 a receiver, the receiver comprising:
  a receiving unit, which comprises one or more processors and is configured to receive signals transmitted by navigation satellites of one or more global navigation satellite systems (GNSS);
  a processing unit, which comprises one or more processors and is configured to determine measurements based on data contained in the signals received and to carry out a calculation of position, velocity and time (PVT) based on batch processing of the measurements; and
  an electric or a chemical drive;
 wherein the receiving unit is further configured to receive the signals transmitted by the navigation satellites non-simultaneously;
 wherein the processing unit is further configured to determine the measurements from the data contained in the signals received non-simultaneously, and to carry out an initial or continuous calculation of the PVT based on batch processing of the measurements;
 wherein the receiving unit is further configured to receive the signals transmitted by the navigation satellites over a predetermined time period;
 wherein the predetermined time period is determined by a minimum requirement for measurements needed, which are required to calculate the PVT with a required accuracy;
 wherein the processing unit is further configured to batch the measurements over the predetermined time period and to carry out the calculation of the PVT based on batch processing of the batched measurements;
 wherein the processing unit is configured further to use a Kalman filter for calculating a PVT; and
 wherein results of the PVT calculated based on batch processing are compared with results of the PVT calculated via the Kalman filter to verify correctness of results of the PVT calculated with the Kalman filter.

6. A method for use in a user satellite, the method comprising:
 receiving, by a receiving unit comprising one or more processors, signals transmitted by navigation satellites of one or more global navigation satellite systems (GNSS); and
 determining, by a processing unit comprising one or more processors, measurements based on data contained in the signals received, and carrying out, by the processing unit, a calculation of position, velocity and time (PVT) based on batch processing of the measurements;
 wherein the receiving unit is further configured to receive the signals transmitted by the navigation satellites non-simultaneously;
 wherein the processing unit is further configured to determine the measurements from the data contained in the signals received non-simultaneously, and to carry out an initial or continuous calculation of the PVT based on batch processing of the measurements;
 wherein the receiving unit is further configured to receive the signals transmitted by the navigation satellites over a predetermined time period;
 wherein the predetermined time period is determined by a minimum requirement for measurements needed, which are required to calculate the PVT with a required accuracy;
 wherein the processing unit is further configured to batch the measurements over the predetermined time period and to carry out the calculation of the PVT based on batch processing of the batched measurements;
 wherein the processing unit is configured further to use a Kalman filter for calculating a PVT; and
 wherein results of the PVT calculated based on batch processing are compared with results of the PVT calculated via the Kalman filter to verify correctness of results of the PVT calculated with the Kalman filter.

7. A non-transitory computer readable medium comprising a computer program for executing a method comprising:
 receiving, by a receiving unit comprising one or more processors, signals transmitted by navigation satellites of one or more global navigation satellite systems (GNSS); and
 determining, by a processing unit comprising one or more processors, measurements based on data contained in the signals received, and carrying out, by the processing unit, a calculation of position, velocity and time (PVT) based on batch processing of the measurements;

wherein the receiving unit is further configured to receive the signals transmitted by the navigation satellites non-simultaneously;

wherein the processing unit is further configured to determine the measurements from the data contained in the signals received non-simultaneously, and to carry out an initial or continuous calculation of the PVT based on batch processing of the measurements;

wherein the receiving unit is further configured to receive the signals transmitted by the navigation satellites over a predetermined time period;

wherein the predetermined time period is determined by a minimum requirement for measurements needed, which are required to calculate the PVT with a required accuracy;

wherein the processing unit is further configured to batch the measurements over the predetermined time period and to carry out the calculation of the PVT based on batch processing of the batched measurements;

wherein the processing unit is configured further to use a Kalman filter for calculating a PVT; and wherein results of the PVT calculated based on batch processing are compared with results of the PVT calculated via the Kalman filter to verify correctness of results of the PVT calculated with the Kalman filter.

* * * * *